(12) United States Patent
Jauk et al.

(10) Patent No.: US 7,835,771 B2
(45) Date of Patent: Nov. 16, 2010

(54) METHOD AND APPARATUS FOR COMBINING PROPERTIES IN MOBILE STATION

(75) Inventors: Sanna Jauk, Vienna (AT); Tommi Lunden, San Diego, CA (US); Jari Majaniemi, Turku (FI)

(73) Assignee: Nokia Corporation, Espoo (FI)

( * ) Notice: Subject to any disclaimer, the term of this patent is extended or adjusted under 35 U.S.C. 154(b) by 353 days.

(21) Appl. No.: 10/087,538

(22) Filed: Mar. 1, 2002

(65) Prior Publication Data

US 2003/0166405 A1  Sep. 4, 2003

(30) Foreign Application Priority Data

Mar. 2, 2001  (FI) ................................. 20010413

(51) Int. Cl.
*H04B 1/38* (2006.01)
*H04M 3/00* (2006.01)
*G08B 5/22* (2006.01)
*H04M 1/725* (2006.01)

(52) U.S. Cl. ................. 455/567; 455/412.1; 455/412.2; 455/466; 455/419; 340/7.6; 340/7.61; 340/7.62

(58) Field of Classification Search ................. 455/566, 455/567, 412.2, 466, 418, 419, 420; 340/7.6, 340/7.61
See application file for complete search history.

(56) References Cited

U.S. PATENT DOCUMENTS 6,070,053 A * 5/2000 Yamashita ................. 340/7.58
6,094,587 A * 7/2000 Armanto et al. ............. 455/567
6,285,891 B1 * 9/2001 Hoshino ..................... 455/567
6,314,306 B1 * 11/2001 Harris ......................... 455/566
6,411,198 B1 * 6/2002 Hirai et al. .................. 340/7.6
6,418,323 B1 * 7/2002 Bright et al. ............. 455/550.1

(Continued)

FOREIGN PATENT DOCUMENTS

EP    1 069 753 A2    1/2001

(Continued)

OTHER PUBLICATIONS

"GSM Technical Specification, 02.87, version 5.2.1, Digital Cellular Telecommunications System . . . ", Nov. 1997, pp. 1-17.

(Continued)

*Primary Examiner*—Un C Cho
(74) *Attorney, Agent, or Firm*—Perman & Green LLP

(57) ABSTRACT

The invention relates to the combining of mobile station properties. In addition the invention relates to the controlling in a desired manner of mobile station properties. The object of the invention is to give a mobile station a more stylish and youthful general appearance by enhancing the chances of the user to personalize his mobile station and by making the methods of communication between mobile stations more versatile. According to the invention it is possible to produce and present to the user various properties perceptible by the different senses, e.g. text, graphics, sound, vibration and/or illumination. These properties can be associated with each other to form effect entities. These effect entities can be transmitted to another mobile station during a conventional connection. In the receiving mobile station the effect entities are presented using different means of expression than the communication data proper.

30 Claims, 2 Drawing Sheets

U.S. PATENT DOCUMENTS

| | | | |
|---|---|---|---|
| 6,418,330 B1 * | 7/2002 | Lee | 455/567 |
| 6,429,366 B1 * | 8/2002 | Terada | 84/645 |
| 6,470,196 B1 * | 10/2002 | Yamashita | 455/567 |
| 6,574,489 B1 * | 6/2003 | Uriya | 455/567 |
| 6,690,955 B1 * | 2/2004 | Komiyama | 455/566 |
| 6,785,563 B2 * | 8/2004 | Tsukamoto | 455/567 |
| 7,295,863 B2 * | 11/2007 | Takenaka | 455/567 |
| 2002/0115456 A1 * | 8/2002 | Narinen et al. | 455/466 |

FOREIGN PATENT DOCUMENTS

| | | |
|---|---|---|
| EP | 1 609 753 | 1/2001 |
| GB | 2 333 209 | 7/1999 |
| GB | 2 333 209 A | 7/1999 |
| JP | 4275749 | 1/1992 |
| JP | 06208394 | 7/1994 |
| JP | 7-34500 | 6/1995 |
| JP | 11196497 | 7/1999 |
| JP | 11-215249 | 8/1999 |
| JP | 11-355393 | 12/1999 |
| JP | 2000-101735 | 4/2000 |
| JP | 2000-115399 | 4/2000 |
| JP | 2000-354089 | 12/2008 |
| WO | WO 00/21267 | 4/2000 |
| WO | WO 01/86986 A1 | 11/2001 |

OTHER PUBLICATIONS

European Office Action dated, Apr. 25, 2006.
JP Office Action, dated Sep. 19, 2006.
Japanese Inquiry from Appeal Board dated Aug. 18, 2008.
Japanese Office Action dated Mar, 5, 2009.

* cited by examiner

METHOD AND APPARATUS FOR COMBINING PROPERTIES IN MOBILE STATION

TECHNICAL FIELD

The invention relates to the combining of properties of a mobile station. The invention also relates to controlling and managing these combined properties in a desired manner.

BACKGROUND OF THE INVENTION

At present the two most common methods of communication between mobile station users are either a direct telephone call or sending a message. Messages conventionally contain text or graphic data. Through messages the users are able to communicate privately, without other persons hearing the conversation. Such communication techniques are currently still very limited.

When a mobile station receives a connection setup request, the user perceives it as he hears the ringing, sees lights coming up or sees a text on the display. The user can control the contents of the display and the sound without turning the apparatus off. The text and/or graphic image output on the display depend on whether the name and number information of the requesting apparatus are stored in the memory of the mobile station and, further, whether this name-number information belongs to a specific caller group. If the name-number information is stored in the memory of the mobile station, the text and/or image on the display indicates the identity of the calling mobile station. If the name-number information belongs to a caller group, the display also shows the caller group identifier. Otherwise the display just indicates that an apparatus is requesting a telephone connection.

Let us next consider existing properties of mobile stations, such as sound, vibration, graphic data and illuminating properties. The sound world of mobile stations is rapidly expanding and one does not have to grow tired of a single sound but, instead, the ringing sound of the telephone apparatus can be changed, for example according to the fashion or season. There are countless ringing sounds to be ordered, and the user may even compose the ringing sound himself. A ringing sound may be associated with a certain caller or caller group. In addition to or instead of a sound alert, vibration may be used to indicate an incoming call. The vibration property is intended to provide additional attention in situations where sound alone is insufficient.

A known way of representing music electronically are the so-called MIDI (Musical Instrument Digital Interface) files, which have even been suggested as means for bringing polyphonic ringing tones to mobile phones. MIDI files are in general used for storing and transferring control information for musical instruments and the file format is standardized by the Midi Manufacturers Association. A MIDI file contains control information for one of more musical instruments. In principle the timing of a played note and its duration are recorded in the file together with any relevant parameters. With this information it is possible to play the musical piece on another MIDI capable device.

Images, which are graphic presentations shown on the display element of a telephone apparatus, may be associated with text messages and caller groups. Graphic objects may be produced by the user himself or they may be ordered from service providers. A graphic image on the display of a user's mobile station serves as a logo or identifier, and it may be e.g. the name and/or logo of the user's firm or an identifier associated with the user's hobbies or interests. Text messages may comprise both text and graphic images. When the apparatus rings and the call request is coming from an apparatus belonging to a certain caller group, the display shows the graphic associated with the caller group.

To illuminate the display and keys, mobile stations use several light units which often are light emitting diode (LED) components. The light units are located on the printed circuit board of the mobile station, where they often are placed on the sides of the display and keypad or between the keys. They are placed in such a manner that the light produced by them is distributed via photoconductors, which are part of the assembly, onto the desired area. Thus the whole front surface of the mobile station, generally the display in the upper part and keypad in the lower part, can be illuminated. Illumination makes it possible to use the apparatus even in poorly lit conditions. Usually, as the apparatus rings or as the user activates the apparatus, the light units in the apparatus light up.

A versatile operating environment is further emphasized when mobile stations become more and more popular. Youthfulness, originality and trendiness are important product characteristics in the ever more competitive mobile station market. The dynamicity of a product has more significance in the market than even the performance of the product.

SUMMARY OF THE INVENTION

The object of the invention is to provide a mobile station with a more fashionable and youthful general appearance by enhancing the chances of the user to personalize his mobile station and by making the methods of communication between mobile stations more versatile.

The object is achieved by expanding the existing mobile station properties to be used in other operating areas of mobile stations than the current known operating areas.

The invention is characterized by what is specified in the characterizing parts of the independent claims.

Two or more mobile station users can communicate not only via a conventional telephone connection but also by sending messages to each other, for example. According to the invention the communications connections may contain, in addition to speech or text, various effects stimulating the visual, auditory or tactile sense or a combination thereof. The added special effects may be e.g. sound, vibration, graphic presentation or illumination by the light components of the apparatus. It is obvious that these properties of a telephone apparatus may also be used to personalize the properties of a user's personal mobile station. Inter-mobile station communication according to the invention verges on multimedia solutions.

The ringing sounds of mobile stations vary from the traditional beeping to composed melodies. Despite the monotony, the sound world is versatile, melodies are easy to recognize and the simple note patterns are memorable and catchy. The primary function of the ringing sounds in mobile stations is to call attention, they are seldom used for anything else. Sound is a basic property of the mobile station, and its field of application can be easily expanded. For instance, in accordance with the invention, the sound of laughter could be attached to a joke sent as a text message.

Together with or instead of sounds, vibration may be used. In that case the apparatus must comprise a vibration unit which can generate the vibrating motion. The vibration rate and rhythm can be controlled or it may be associated with the rhythm of the sound, for instance. A vibration unit is a good supplement to the sound world, but it can also be used totally independent of sounds. Vibration may be synchronized with the flashing of leds, for example, or it may have a rhythm of its own, which is independent of the other properties. According to the invention, vibration may be combined with a text message or it may be transmitted to the receiving apparatus during a call.

The lighting of the user interface may also be controlled in a mobile station. For example, the display and keypad of the apparatus may flash in a given rhythm. This property, too, adds to the noticeability. The flashing rhythm and pace of the light units are variable and their control may be based on the ringing sound used or the user may determine the pace himself. Different colors may also be used in the light units. The light units are lit up individually, in groups and/or in different colors. By changing the color one can match the illumination of the apparatus with the other properties thereof, such as e.g. the color of the cover. Illumination control may also be added to a text message to be sent to the receiving apparatus, or an illumination control command may be transmitted to the receiving apparatus during a call.

In addition to sounds, vibration and lighting, a mobile station can adduce graphics. Brief animations can be presented on the display, associated with various combinations of all the properties mentioned above. Images are already featured in text messages, but now they can be associated with e.g. sound, or the lights of the display can be lit in various colors when a graphic is displayed.

The user may program these functions in his own apparatus or send them to the receiving apparatus. The properties thereby serve both as a means of personalizing the user's telephone apparatus and as a supplement or alternative to conventional methods of communication. Communication by mobile stations verges on multimedia applications in that it is possible to combine effects perceptible with different senses. On the other hand, communication properties are emphasized in mobile stations since a real-time connection is maintained at the same time. The invention is advantageously and easily applicable to mobile communication devices. Moreover, the alternative means of attracting attention facilitate the use of a mobile station among users with sensory defects.

BRIEF DESCRIPTION OF DRAWINGS

The invention is below described more closely, referring to the preferred embodiments presented by way of example and to the accompanying drawings in which.

DETAILED DESCRIPTION OF DRAWINGS

Figure 1:
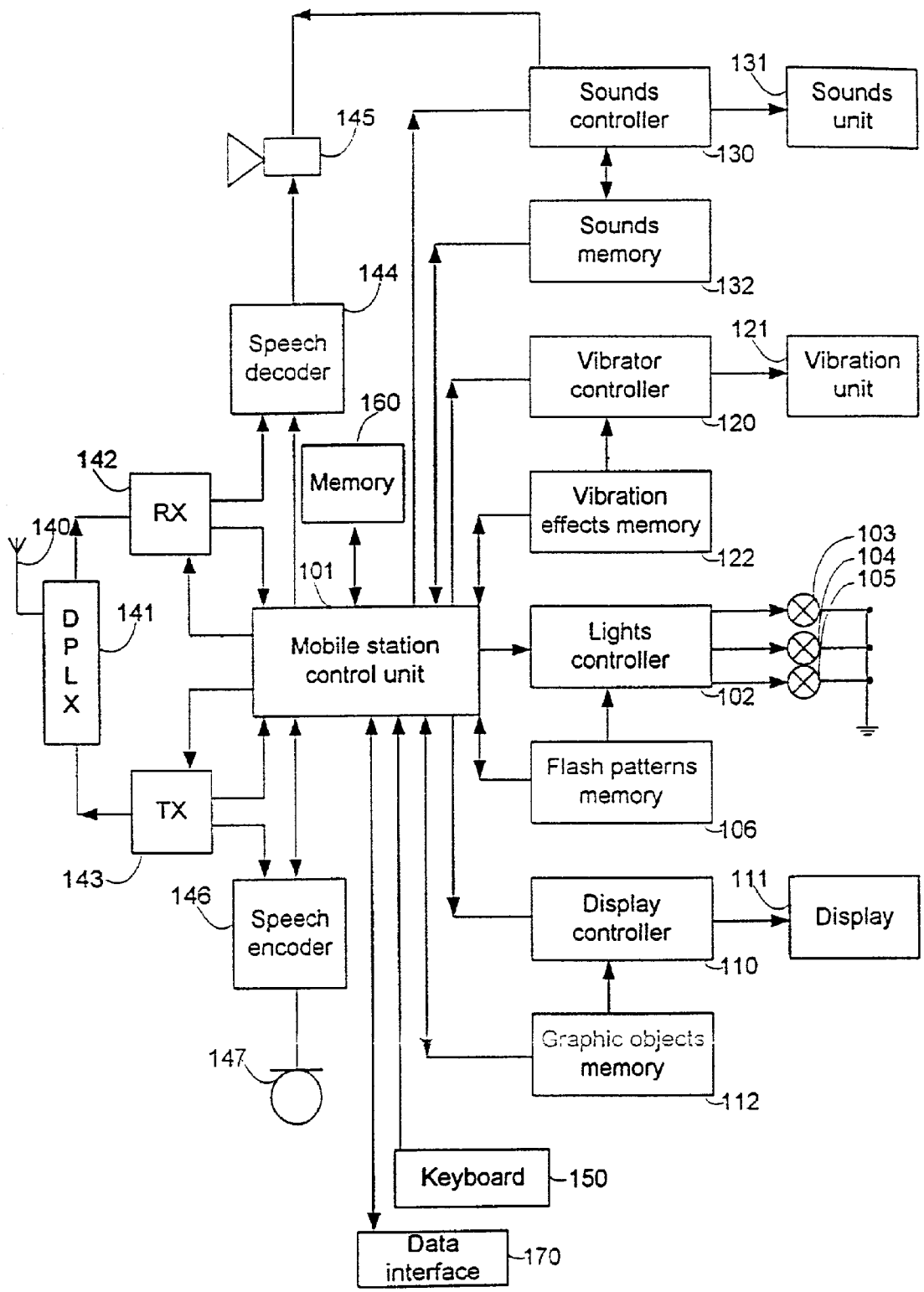
FIG. 1 shows a mobile station according to a preferred embodiment.

Let us consider the mobile station shown in FIG. 1, which comprises the essential components according to a preferred embodiment. The mobile station includes a control unit 101 which is responsible for the operation of the whole mobile station. The control unit 101 comprises a microprocessor by means of which functions are controlled and monitored. The mobile station further includes a memory 160, keyboard 150 and a data interface 170 dependent on the particular device and application.

Messages to be sent from the mobile station are composed in the control unit 101 from which they are directed to a transmitter part TX 143 and thence via a duplexer 141, which may be a filter or switch, to an antenna 140 to be transmitted further. Sounds received by a microphone 147 can be directed via a speech encoder 146 to the control unit 101. Messages received by the antenna 140 are directed via the duplexer 141 to a receiver part 142 from which place the message is taken further depending on its type. Received messages may be directed either via the control unit 101 to a message-processing unit or direct to a speech decoder 144 and thence to a loudspeaker 145.

A sounds control unit 130 takes care of the processing of sounds which are not generated in the speech decoder 144. The sounds control unit 130 may fetch or store sounds or different note patterns from a discrete memory unit 132 containing sounds. The sounds control unit 130 sends the sounds to be reproduced either in the sounds unit 131 or loudspeaker 145. The control unit 101 and sounds memory 132 are interconnected, so it is possible to store data in or fetch data from the sounds memory 132 via the control unit 101. Storing data from the control unit 101 into the sounds memory 132 means that a new sound is saved for later use. The control unit may read data from the sounds memory e.g. when a sound is to be transmitted as part of a message to another user's mobile station.

The vibration control unit 120 may receive data from the control unit 101 or from the vibration effects memory 122. The received data is sent by the vibration control unit 120 to be executed in the vibration unit 121. Also the vibration effects memory 122 is bi-directionally connected with the control unit 101. Thus it is possible to store vibration data via the control unit 101 into the vibration effects memory 122 and fetch vibration data from the memory for processing.

Illumination control unit 102 gets flash patterns from the flash patterns memory 106 or from the mobile station's control unit 101 if the flash pattern is received from another apparatus. The illumination control unit 102 forwards the flash patterns to the light units 103, 104, 105 which illuminate the user interface of the mobile station; here can be seen three light units by way of example. Some of these light units may be background lights for the display. The flash patterns memory 106 is interconnected with the mobile station's control unit 101 which may fetch flash patterns from the memory for processing or store them into the memory 106 for future use.

Data is input to the display control unit 110 from the mobile station control unit 101 or graphic objects memory 112. The display controller 110 directs the data further to the display 111 where it is presented to the user. The control unit 101 also has a direct connection with the graphic objects memory 112, which means the control unit can process the graphic objects in memory e.g. by modifying, deleting or adding them. Furthermore, by means of the control unit 101 it is possible to combine objects and add properties to them, such as displaying multiple images in a row, whereby the output displayed to the user is a brief animation.

So, the mobile station control unit 101 may compile data from the sounds memory 132, vibration effects memory 122, flash patterns memory 106 and graphic objects memory 112, and build associations between various data according to their properties or according to instructions from the user. The control unit 101 may send the compiled entity to its controllers for execution or to the transmitter unit 142 from where the data packet is further transmitted via the duplexer 141 and antenna 140 to another mobile station, for instance.

According to one embodiment of the present invention a ringing tone includes control data for the vibration unit and other effects. According to other advantageous embodiment of the present invention the control information of the mobile station units, for example the vibration unit and lights, are recorded in an MIDI file. This will enable the synchronization of music with vibration and lighting effects. These effects will be downloaded together with the original MIDI file, e.g. the ringing tone.

An effect can be added to a MIDI file as an instrument. This enables a user to set the height of a note also for added effects, such as vibration frequencies. The other alternative to add an effect in a MIDI file is to handle the effect as an percussion instrument. The general MIDI specification has a convention for percussion instruments and the added effects can be added to this group.

The control of lights could be implemented as an instrument. Each light unit on the mobile station would then be seen as a different note, a lower note corresponding to a light unit on the lower part of the mobile station and a higher one to a light unit in the upper part of the mobile station. The intensity of the light can also be set for each light unit separately.

Let us next consider more closely these functions which can be used to supplement the conventional personalization and communication properties of a mobile communication device.

The ringing sound chosen by the user tells something about him to other people. Moreover, the owner of the apparatus will recognize the sound emanating from his apparatus, and maybe the ringing sound even indicates a certain caller so that the user knows how to react to the call. The sound data selected may be activated in the user's own apparatus also at other times than in connection with ringing, and the sound data may also be transmitted to the receiving apparatus. The sound data selected may be activated in conjunction with a certain function of the phone. For instance, when a calendar reminds of a birthday, the sound controller can fetch a birthday song from the memory and send it to the loudspeaker. Moreover, sound data can be instructed to be executed at a certain hour of the day, e.g. so that at six o'clock in the morning the apparatus plays the melody "Are you sleeping, are you sleeping, Brother John". In addition, the reproduction of sound may be activated as a consequence of a certain action by the user.

Sound data may be transmitted to the receiving apparatus e.g. as a ringing command when a connection has been set up. Thus the calling mobile station can determine the ringing sound. Sound data may also be transmitted in such a manner that it is activated as soon as it is received or after a certain period of time or as a result of some action. For example, an effect in the middle of a text message may be activated when the text message is read, whereby the effects according to the instructions are executed and normal reading of the message can continue. A text message may e.g. comprise a quotation from a song as part of the normal text. Preceding the quotation there may now be an effect start command to activate the sounds controller so that when the reader of the message reads the quotation, he at the same time activates the corresponding music to be played in his apparatus. At the end of the quotation or message there is a corresponding effect end command which terminates the execution in the sounds controller, or the effect is terminated when the message has been read, for instance.

All functions executed using sound data may in addition or alternatively be carried out by activating the vibration unit and producing various vibrations in user's own or in the communicating apparatus. If vibration is associated with sound data, it is possible to produce sound-synchronized vibration to stimulate the recipient's tactile sense. Vibration may be added e.g. to text by activating the vibration unit at a suitable place in the text. Again, activation may be realized based on the time or associated with an action, such as the pressing of a key, or the activation of the vibration unit may occur in the receiving apparatus as soon as it receives the so-called vibration command. As part of a telephone call or text message a vibration effect may emphasize e.g. a cold weather or electricity in the air. Stimulation of the tactile sense adds considerably to the communication. Vibration transmitted may consist of only a single effective vibratory movement.

Graphic data presented on the display may comprise text as well. Graphic data can be very informative and add to the noticeability and intelligibility of notes and messages. According to an embodiment of the invention, visual properties of the display can be altered in such a manner that the data on the display is rotated, rolled about or distorted. Rotation may be realized e.g. by rotating the text on the display by 90° every few seconds, whereby the reader has to rotate his phone always when the orientation of the text changes. If the display is circular, the text can be output, instead of lines, into a circular shape where the text spirals in or out. The data displayed, such as an image and/or text, may scroll on the display at a predetermined pace from the beginning of the data area to the end of it. Furthermore, the display may be distorted e.g. by rounding the edge regions or magnifying the central region and shrinking the edge regions. Such a distortion is emphasized if a checkered or grid pattern is used. Moreover, lines that are originally straight show the distortions effectively. In addition to conventional text and images, the visual effects include light effects, which we will discuss more in the following.

A property which is visible as lighting fluctuation in the display and keypad of the telephone apparatus and produced by controlling the lighting-up and dimming-down of the light units in the telephone apparatus, i.e. the current fed to the light units, is here called a flash pattern.

Let us next consider different flash pattern alternatives. The simplest alternative, after the option in which the lights are continuously on, is that all the light units are flashing rapidly at the same time. If it is possible to vary the current fed into the light units, a more stylish option can be realized by adapting the normal flashing rhythm in such a manner that the light units are first dark, lighting is then increased to a peak, and the light units are then again darkened via a dimming phase. Just by repeating this flash pattern the telephone apparatus appears more advanced than a telephone apparatus with plain on/off flashing. One option is to illuminate the keypad and display parts of the phone apparatus alternately. A different visual effect is achieved by alternately lighting up light unit groups, e.g. the right and left light unit columns in the telephone apparatus. A streamlined effect is accomplished by repeating a flash pattern in which light units on both sides are lit up starting with the uppermost lights and then turning them off in the same order. One option is such that the flash pattern starts from a corner of the telephone apparatus so that when the light in the adjacent corner comes on, the preceding light goes off, thus creating an impression that the light goes round and round the apparatus. Random turning on and off of the light units creates a starlight effect. There are many different flash pattern options and only a few were described above by way of example. Moreover, each option spawns more alternative implementations if colors are used in the individual light units. The execution (flashing) of all the flash patterns occurs at a given predetermined pace.

The flash patterns, too, can be associated with the properties of the user's apparatus and also transmitted to another user's apparatus. While the noticeability of flash patterns is emphasized in the dark, a normal message can be enhanced by flashing the lights of the display at the right moment. For example, a Christmas greeting or Valentine's Day message can be enhanced by turning the lights red. Again it is naturally possible to combine a flash pattern with e.g. the above-mentioned message containing part of the lyrics of a song so that the flash pattern is adapted to the music played.

There are many alternative implementations. The control menu of the phone apparatus could e.g. include an item where the user selects a flash pattern, vibration, sound, graphic, animation or some other effect to be executed in conjunction with ringing, for example. So it is possible to choose various effects in the same way as the conventional ringing sound or volume. According to an embodiment, the additional effect is specific to a certain ringing sound. The ringing sound may of course be silent, too.

In a preferred embodiment the telephone apparatus has preset modes for combined effects. Thus the effects can always be used in accordance with the current preset mode. For example there can be a setting "Backlight Alert" or a "Vibrating Alert" under the profiles. When a user selects one of these profiles, he gets a selection list for "default", "rhythm" and "off". If the user selects the "default" for the "Backlight Alert", during a message and a normal call alert the backlights are on and during a silent call alert, the backlights flash, for example by going on and off in 500 milliseconds intervals. If the user selects the "rhythm", during a message and a normal call alert, the backlights follow the rhythm of the current tone, alias the backlights go on and off according to the current message alert tone or the current ringing tone. During a silent call backlights flash. If the user selects "off", the backlights stay off during message alert and call alert. For a profile "Vibrating Alert" the "default" can be defined to its normal behavior so that some ringing tones may contain own coding for vibrating alert and this is then used. The "rhythm" indicates vibration following the rhythm of a current tone of a message or ringing alert. During a silent call alert vibrating alert works similarly to default. If user selects "off" for "Vibrating Alert" this stays off during message and call alerts.

In a more advanced embodiment the user may edit the modes as he likes. For example, the user may fetch into the memory of his mobile station a certain ringing sound, add vibration to it at a certain location, determine a flash pattern according to the rhythm, and select an image to be displayed at the same time. The user can store the combined effect in his mobile station's memory. This combined effect can be later sent e.g. as part of a text message to another mobile station. The effects may also be executed in the user's own apparatus or they can be directed to another mobile station during a call.

Let us consider a mobile station according to a preferred embodiment where the user interface and software are supplemented with an application which is able to communicate with a corresponding application in the receiving phone apparatus. The application lets the user add into the normal phone call above-mentioned effects such as text, images, animations, light effects, sound and/or vibration. Let us consider the transmission of such a message between two mobile communication devices, referring to FIG. 2.

Figure 2:
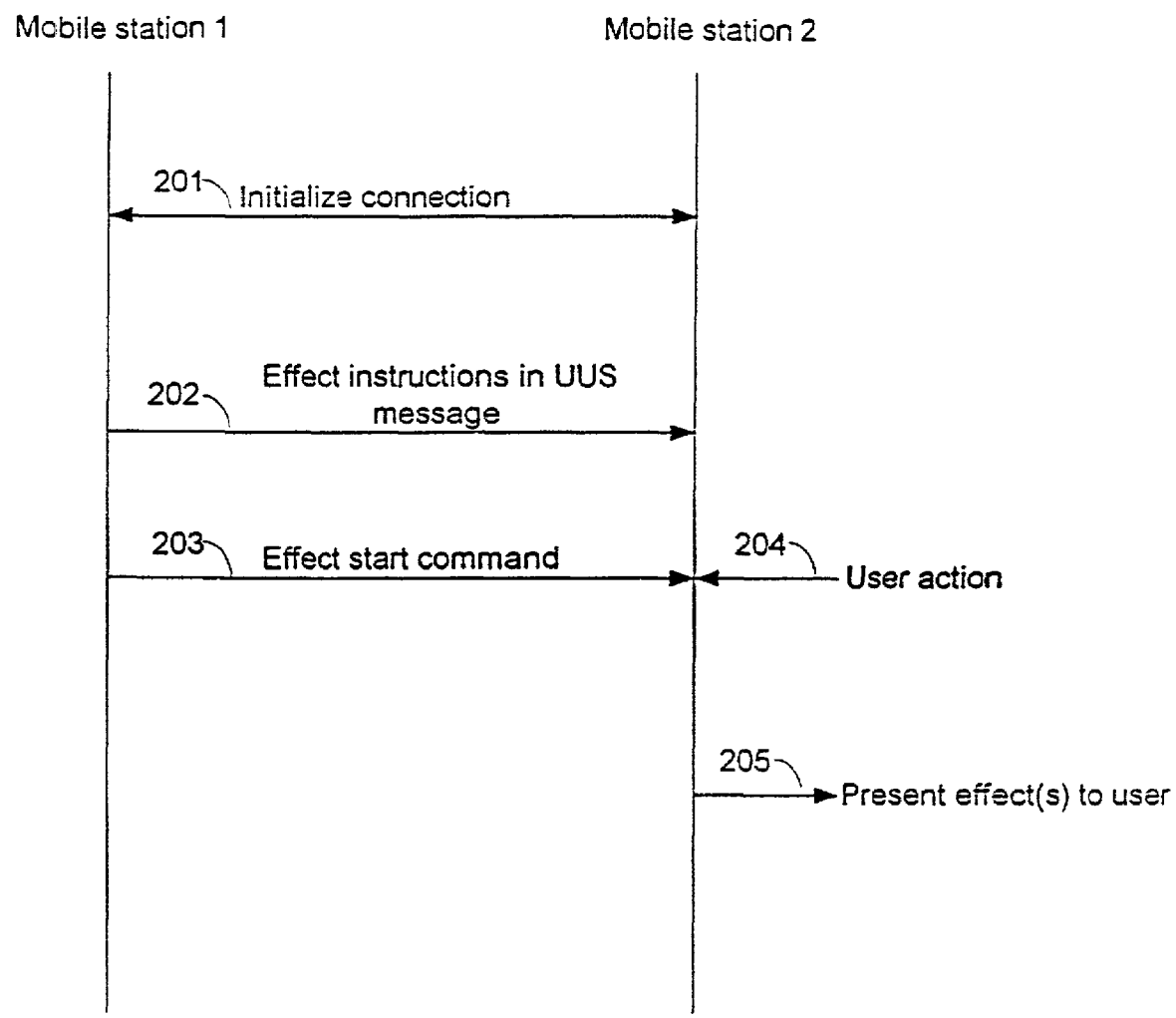
FIG. 2 shows by way of example alternative ways of transmitting a message between mobile stations according to a preferred embodiment.

FIG. 2 shows two mobile stations, mobile station 1 and mobile station 2. A connection is initialized 201 when one of the mobile stations, mobile station 1 in this case, makes a call request. A communication connection may exist between mobile stations 1 and 2 for the whole time of message transmission and activation shown in FIG. 2. In step 202 mobile station 1 sends to mobile station 2 the effect instructions using a User-to-User Signaling (UUS) message. The mobile station may either load a whole new set of effect instructions to be sent or choose an existing one.

An effect start command 203, i.e. an activation command for a transmitted effect entity, can be sent at a desired moment from mobile station 1 to mobile station 2 using UUS in a voice call or SMS (Short Message Service) with a text message or otherwise. If such a message is not sent, the effect can be activated e.g. by a certain user action 204 by the user of mobile station 2, such as the pressing of a key or reading a message or dialing a certain number. For example, it is possible to compile for the receiving apparatus a combined effect containing the text "I'm at a meeting" and the melody "A Hard Day's Night", which is activated when the receiving apparatus attempts to establish a connection with the mobile station that sent the effect entity. This way, the mobile station at the meeting will not flash or make sounds, and the apparatus trying to establish the connection will receive an informative effect message. Furthermore, the message itself may contain an activation command, whereby the effects in the message will be executed as soon as the message is received. These methods of activation are alternative to each other. All of them lead to step 205 where the effects are presented to the user of mobile station 2.

If the effect entity was sent to the receiving mobile station as part of a text message, the effect entity is associated with the message and is automatically stored with the message. The effect entity may also be stored separately from the message. Indeed the effect entity may be sent independently, unassociated with any other message. The effect entity includes an activation instruction specifying the time of or triggering action for presenting the effect entity. In addition the effect entity may include information about whether the message is displayed in the receiving apparatus just once, for a certain period of time, or whether the presentation can be activated as many times as the user of the receiving apparatus wants.

The invention claimed is:

1. A method comprising:

establishing a connection between a first mobile station and a second mobile station, transferring speech data or message data representing a first effect for stimulating an auditory or visual sense via the established connection as a ringing command;

transferring data compiled from vibration effects memory, flash patterns memory or graphic objects memory for producing a second effect for stimulating a visual or tactile sense by the same established connection as the ringing command using a signaling message associated therewith, producing the first effect for stimulating an auditory or visual sense in the second mobile station, while maintaining said connection, using a first means of expression comprising at least one element selected from the group of a loudspeaker and a display, and producing the second effect stimulating a visual or tactile sense in the second mobile station, while maintaining said connection, using a second means of expression comprising at least one element selected from the group of a vibration unit, at least one light unit and the display, which is selected differently from the elements of the first means of expression, and wherein said second effect for stimulating a visual or tactile sense comprises a lighting effect or a vibration effect, wherein the first effect for stimulating an auditory or visual sense and the second effect stimulating a visual or tactile sense is activated so as to be presented as a consequence of a certain user action in the second mobile terminal.

2. The method according to claim 1,
wherein establishing a connection comprises establishing a two-way telephone connection between the first mobile station and the second mobile station,
wherein transferring speech data or message data comprises transmitting data compiled from sounds memory or graphic objects memory forming the first effect for stimulating a visual or auditory sense via the telephone connection,
and wherein transferring or activating data comprises transmitting data compiled from vibration effects memory, flash patterns memory or graphic objects memory forming the second effect for stimulating a visual, or tactile sense in a User-to-User Signaling (UUS) message associated with the telephone connection.

3. The method according to claim 1,
wherein establishing a connection comprises establishing a text message connection between the first mobile station and the second mobile station, and
wherein transferring speech data or message data and transferring or activating data comprise transmitting data compiled from sounds memory, vibration effects memory, flash patterns memory or graphic objects memory forming the first and second effects in a text message.

4. The method according to claim 1, wherein transferring speech data or message data and transferring or activating data comprise transmitting data compiled from sounds memory, vibration effects memory, flash patterns memory or graphic objects memory forming the first and second effects in a MIDI (Musical Instrument Digital Interface) file.

5. The method according to claim 1, wherein the second effect further comprises a graphics effect presented on the display.

6. The method according to claim 5, wherein the graphics effect comprises an animation or an image.

7. The method according to claim 1, wherein producing the second effect comprises generating a plurality of second effects for stimulating visual or tactile senses at the same time in the mobile station to form an effect entity combined from effects stimulating visual or tactile senses.

8. The method according to claim 1, wherein the second effect for stimulating a visual or tactile sense is activated so as to be automatically presented by the second means of expression comprising of a vibration unit, light units or a display.

9. The method according to claim 1, wherein the second effect for stimulating a visual or tactile sense is activated so as to be presented by the second means of expression comprising of a vibration unit, light units or a display as a consequence of certain user action.

10. The method according to claim 1, wherein the second effect for stimulating a visual, auditory or tactile sense is activated so as to be presented by the second means of expression comprising of a vibration unit, light units or a display when a certain start instruction is activated.

11. The method according to claim 1, wherein producing the second effect comprises transmitting data compiled from sounds memory, vibration effects memory, flash patterns memory or graphic objects memory for activating a second effect stimulating visual, auditory or tactile sense via the same established connection.

12. The method according to claim 1, wherein said established connection is a voice call.

13. A second mobile station comprising:
a transmitter and/or receiver for establishing a connection between a first mobile station and second mobile station,
a control unit for receiving speech data or message data of the first mobile station representing a first effect stimulating auditory or visual sense as a ringing command via the established connection;
the control unit for receiving data of the first mobile station compiled from vibration effects memory, flash patterns memory or graphic objects memory for producing a second effect stimulating a visual or tactile sense by the same established connection as the ringing command using a signaling message associated therewith,
at least one first element selected from the group of a loudspeaker and a display to present in the second mobile station, while maintaining said connection, the first effect stimulating auditory or visual sense by using the data representing the first effect, and
at least one second element selected from the group of a vibration unit, at least one light unit and the display, which is selected different from the at least one first element, for producing in the second mobile station, while maintaining said connection, the second effect stimulating visual, auditory or tactile sense by using the data representing the second effect, wherein said second effect for stimulating a visual or tactile sense is at least a lighting effect or a vibration effect,
wherein the first effect for stimulating an auditory or visual sense and the second effect stimulating a visual or tactile sense is activated so as to be presented as a consequence of a certain user action in the second mobile terminal.

14. The second mobile station of claim 13, further comprising a sounds unit, a sounds controller, and a sounds memory for controlling sound effects.

15. The second mobile station of claim 14, wherein the first control unit is configured for transmitting data compiled from sounds memory, vibration effects memory, flash patterns memory or graphic objects memory for activating a second effect stimulating visual, auditory or tactile sense via the same established connection.

16. The second mobile station of claim 13, further comprising a vibration unit, a vibrator controller, and a vibration effects memory for controlling vibration effects.

17. The second mobile station of claim 13, further comprising light units, a lighting controller, and a flash patterns memory for controlling lighting effects.

18. The second mobile station of claim 13, further comprising a display, a display controller, and a graphic objects memory for controlling visual effects.

19. The second mobile station of claim 13, wherein the first or second element comprises a loudspeaker, a sounds unit, a vibration unit, light units or a display for presenting effects simultaneously as an effect entity combined from effects stimulating visual, auditory or tactile sense.

20. The second mobile station of claim 13, wherein the control unit is configured for downloading a MIDI file for accessing the effect entity.

21. The second mobile station of claim 13, wherein said established connection is a voice call.

22. An apparatus comprising:
a transmitter and/or receiver for establishing a connection between a first mobile station of said apparatus and a second mobile station of said apparatus,
a first control unit for transferring speech data or message data of the first mobile station representing a first effect stimulating auditory or visual sense as a ringing command via the established connection;
the first control unit for transferring data of the first mobile station compiled from vibration effects memory, flash patterns memory or graphic objects memory for producing a second effect stimulating a visual or tactile sense by the same established connection as the ringing command using a signaling message associated therewith, a second control unit for receiving speech data or message data of the first mobile station in the second mobile station representing a first effect stimulating auditory or visual sense as a ringing command via the established connection;

the second control unit for receiving data of the first mobile station in the second mobile station compiled from vibration effects memory, flash patterns memory or graphic objects memory for producing a second effect stimulating a visual or tactile sense by the same established connection as the ringing command using a signaling message associated therewith, at least one first element selected from the group of a loudspeaker and a display to present in the second mobile station, while maintaining said connection, the first effect stimulating auditory or visual sense by using the data representing the first effect, and at least one second element selected from the group of a vibration unit, at least one light unit and the display, which is selected different from the at least one first element, for producing in the second mobile station, while maintaining said connection, the second effect stimulating visual, auditory or tactile sense by using the data representing the second effect, wherein said second effect for stimulating a visual or tactile sense is at least a lighting effect or a vibration effect, wherein the first effect for stimulating an auditory or visual sense and the second effect stimulating a visual or tactile sense is activated so as to be presented as a consequence of a certain user action in the second mobile terminal.

23. The apparatus of claim 22, wherein the first control unit is configured for transmitting effects to be presented on a second mobile station.

24. The apparatus of claim 23, wherein the first control unit is configured for transmitting effects to a second mobile station as part of a text message.

25. The apparatus of claim 24, wherein the apparatus comprises means for activating effects automatically.

26. The apparatus of claim 25, wherein the first control unit or the second control unit is configured for activating effects to be presented when a certain start instruction is activated.

27. The apparatus of claim 24, wherein the apparatus comprises means for activating effects as a consequence of user action.

28. The apparatus of claim 23, wherein the first control unit is configured for transmitting effects to a second mobile station during a telephone connection using a User-to-User Signaling (UUS) message associated with the telephone connection.

29. A second mobile station comprising:

means for establishing a connection between a first mobile station and second mobile station, means for receiving speech data or message data of the first mobile station representing a first effect stimulating auditory or visual sense as a ringing command via the established connection;

means for receiving data of the first mobile station compiled from vibration effects memory, flash patterns memory or graphic objects memory for producing a second effect stimulating a visual or tactile sense by the same established connection as the ringing command using a signaling message associated therewith, means selected from the group of a loudspeaker and a display to present in the second mobile station, while maintaining said connection, the first effect stimulating auditory or visual sense by using the data representing the first effect, and means selected from the group of a vibration unit, at least one light unit and the display, which is selected different from the at least one means selected from the group, for producing in the second mobile station, while maintaining said connection, the second effect stimulating visual, auditory or tactile sense by using the data representing the second effect, wherein said second effect for stimulating a visual or tactile sense is at least a lighting effect or a vibration effect, wherein the first effect for stimulating an auditory or visual sense and the second effect stimulating a visual or tactile sense is activated so as to be presented as a consequence of a certain user action in the second mobile terminal.

30. An apparatus comprising:

means for establishing a connection between a first mobile station of said apparatus and a second mobile station of said apparatus, means for transferring speech data or message data of the first mobile station representing a first effect stimulating auditory or visual sense as a ringing command via the established connection;

means for transferring data of the first mobile station compiled from vibration effects memory, flash patterns memory or graphic objects memory for producing a second effect stimulating a visual or tactile sense by the same established connection as the ringing command using a signaling message associated therewith, means for receiving speech data or message data of the first mobile station in the second mobile station representing a first effect stimulating auditory or visual sense as a ringing command via the established connection;

means for receiving data of the first mobile station in the second mobile station compiled from vibration effects memory, flash patterns memory or graphic objects memory for producing a second effect stimulating a visual or tactile sense by the same established connection as the ringing command using a signaling message associated therewith, means selected from the group of a loudspeaker and a display to present in the second mobile station, while maintaining said connection, the first effect stimulating auditory or visual sense by using the data representing the first effect, and means selected from the group of a vibration unit, at least one light unit and the display, which is selected different from the at least one means selected from the group, for producing in the second mobile station, while maintaining said connection, the second effect stimulating visual, auditory or tactile sense by using the data representing the second effect, wherein said second effect for stimulating a visual or tactile sense is at least a lighting effect or a vibration effect, wherein the first effect for stimulating an auditory or visual sense and the second effect stimulating a visual or tactile sense is activated so as to be presented as a consequence of a certain user action in the second mobile terminal.

* * * * *